United States Patent [19]

Bayley et al.

[11] Patent Number: 5,532,327
[45] Date of Patent: Jul. 2, 1996

[54] RANDOM COPOLYMERS MADE BY ANIONIC POLYMERIZATION, TONERS INCORPORATING THESE COPOLYMERS AND METHOD FOR THE MANUFACTURE THEREOF

[75] Inventors: Robert D. Bayley, Fairport; Thomas R. Hoffend, Webster; Timothy J. Fuller, West Henrietta; Suresh K. Ahuja, Webster, all of N.Y.

[73] Assignee: Xerox Corporation, Stamford, Conn.

[21] Appl. No.: 394,580

[22] Filed: Feb. 27, 1995

Related U.S. Application Data

[63] Continuation of Ser. No. 76,364, Jun. 14, 1993, abandoned, which is a continuation of Ser. No. 814,653, Dec. 30, 1991, abandoned.

[51] Int. Cl.$^6$ ............................................. C08F 4/48
[52] U.S. Cl. ........................ 526/180; 526/335; 526/340
[58] Field of Search ................................. 526/180, 335, 526/340

[56] References Cited

U.S. PATENT DOCUMENTS

| | | | |
|---|---|---|---|
| 3,496,154 | 2/1970 | Wofford | 260/84.7 |
| 4,396,741 | 8/1983 | Bean | 525/51 |

*Primary Examiner*—David W. Wu
*Attorney, Agent, or Firm*—Finnegan, Henderson, Farabow, Garrett & Dunner

[57] ABSTRACT

A solution polymerization process for producing an organic polymer from styrene and at least one other polymerizable monomer comprising providing a liquid reaction medium suitable for conducting said polymerization, wherein the reaction medium contains styrene and a polymerizable monomer other than styrene; and, anionically polymerizing styrene and monomer, thereby forming random copolymer chains, wherein the total quantity of said styrene used in said polymerization is at least 50% by weight based on the total weight of styrene and other polymerizable monomers used in the polymerization. A second embodiment comprises a copolymer made by the above-described method.

A third embodiment comprises a process for forming a toner, wherein the process comprises providing a liquid reaction medium suitable for conducting a solution polymerization, the reaction medium containing at least two polymerizable monomers; anionically polymerizing the monomers, thereby forming random and nearly random copolymer chains; finely dividing the copolymer into particles; and, incorporating said particles into a composition for use as a toner. A fourth embodiment comprises a toner made by extrusion with pigment or colorant and change control additive to form small particles.

A fifth embodiment comprises a solution polymerization process for producing an organic polymer wherein a difunctional initiator is used to initiate said polymerization.

8 Claims, 4 Drawing Sheets

RANDOM COPOLYMERS MADE BY ANIONIC POLYMERIZATION, TONERS INCORPORATING THESE COPOLYMERS AND METHOD FOR THE MANUFACTURE THEREOF

This is a continuation of application Ser. No. 08/076,364, filed Jun. 14, 1993, now abandoned which is a continuation of Ser. No. 07/814,653, filed Dec. 30, 1991, now abandoned.

BACKGROUND OF THE INVENTION

The present invention relates a method for making random copolymers and toner materials which incorporate such copolymers. The invention also relates to copolymers and toners made by this method.

In the prior art, randomizing agents and polar modifiers such as N,N,N',N'-tetramethylenediamine (TMEDA), tetrahydrofuran (THF) and 1,2-dipiperidinoethane (DPE) have been used to produce poly-1,2-butadiene with more than 95% 1,2-vinyl groups while using organolithium initiators such as n- or s- butyllithium. Halasa et al., *Advances in Organometallic Chemistry*, Vol. 18, No. 55 (1980), have shown that in reactions involving butadiene, less than 35 wt % styrene and 2 equivalent moles of TMEDA or DPE per mole of organolithium initiator group, the reaction rate is accelerated compared with polymerization rates without polar modifiers. Moreover, 1,2-vinyl content of the product is increased markedly and monomer insertion in the polymer chain approaches a nearly random condition. However, the polymers produced by Halasa et al. are not suitable for use in toners. The styrene content of these polymers is so low that they are not brittle enough to be formed into toner particles in a commercially feasible operation.

U.S. Pat. No. 4,469,770 discloses a method of making a toner comprising a styrene butadiene copolymer. The copolymer contains from about 85 to about 93 weight percent styrene and from about 7 to about 15 weight percent butadiene. Copolymers which are used in toners are often produced by free radical polymerization, as described in U.S. Pat. No. 3,634,251.

Block copolymers which have been reported to be suitable for use in toner compositions were disclosed in U.S. Pat. Nos. 3,965,021, 3,967,962 and 4,528,257. Graft copolymers have also been used in toner compositions as described in U.S. Pat. No. 4,385,107. A toner composition comprising a copolymer is described in U.S. patent application Ser. No. 621,704 filed Dec. 3, 1990, now U.S. Pat. No. 5,166,026, and U.S. patent application Ser. No. 587,194 filed Sep. 24, 1990, now U.S. Pat. No. 5,158,851.

In the absence of polar modifiers and at low styrene-to-butadiene monomer ratios, butadiene polymerizes preferentially compared with styrene, high 1,4-butadiene enchantment results, and graded block copolymers are formed with enriched styrene tails. Block copolymers of polystyrene and poly 1,4-butadiene have many advantages for specific elastomer applications. However, random, nearly random and very short block copolymers are preferred as the chief resin component in toners. Moreover, incorporation of 1,2-butadiene segments in the polymer chain allows an increased amount of butadiene to be used in the styrene copolymer structure without loss in the brittleness required for processing into small toner particles. Copolymers with decreased styrene content usually fuse at lower temperatures.

SUMMARY OF THE INVENTION

An object of one embodiment of the present invention is to overcome the problems and disadvantages of the prior art by producing random copolymers by anionic polymerization. The polymerization is preferably carried out in the presence of randomizing agents. These copolymers may be used as the chief resin component in toners suitable for photocopying and related applications.

Additional objects and advantages of the invention will be set forth in part in the description that follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a first embodiment of the present invention comprises a solution polymerization process for producing an organic polymer from styrene and at least one other polymerizable monomer, providing a liquid reaction medium suitable for conducting the polymerization, wherein the reaction medium contains styrene and a polymerizable monomer other than styrene; and anionically polymerizing the styrene and the monomer, thereby forming random copolymer chains, wherein the total quantity of the styrene used in the polymerization is at least 50% by weight based on the total weight of styrene and other polymerizable monomers used in the polymerization. A second embodiment comprises a copolymer made by the above-described method.

A third embodiment comprises a process for forming a toner, wherein the process comprises providing a liquid reaction medium suitable for conducting a solution polymerization, the reaction medium containing at least two polymerizable monomers; anionically polymerizing the monomers, thereby forming random copolymer chains; finely dividing the copolymer into particles; and incorporating the particles into a composition for use as a toner. A fourth embodiment comprises a toner made by the above-described method.

A fifth embodiment comprises a solution polymerization process for producing an organic polymer, which comprises providing a liquid reaction medium suitable for conducting the polymerization, the reaction medium containing a randomizing agent, styrene and a polymerizable monomer other than styrene and wherein the total quantity of the styrene used in the polymerization is at least 50% by weight based on the total weight of styrene and other polymerizable monomers used in the polymerization; and, anionically polymerizing the monomer and the styrene, wherein a difunctional initiator is used to initiate the polymerization.

THEORETICAL DESCRIPTION

Theory Behind The Use of Polar Modifiers With Organolithium Reagents In The Polymerization of Styrene And Butadiene.

Anionic polymerization of styrene with either of butadiene or isoprene allows the preparation of random, block and multi-block copolymers with precise control of molecular weight, butadiene stereochemistry, monomer content and monomer sequence. Unique copolymers can be made because styrene and butadiene are interchangeable in the living anionic polymerization process.

Four categories of styrene-butadiene copolymer architectures can be made. Uniformly random copolymers have monomers in a statistically random distribution in the polymer chain. Random copolymers have continuously changing monomer compositions without block sequences in the polymer chain. Block copolymers have graded or segmented blocks of monomers, i.e. two or more block sequences, one of which is not a homopolymer and not uniformly random. Ideal block copolymers have pure block monomer sequences with well defined interfaces, i.e. junctures between blocks. The controlled distribution of monomer in the polymer and the regulated stereochemistry of the butadiene enchantment in cis, trans and vinyl conformations allows the formation of a nearly infinite number of copolymers.

Monomer sequence distributions and the structure of the butadiene component in the living polymers prepared by anionic polymerization are determined by the mode of monomer addition, segment concentration, solvent, initiator, temperature, stirring rate, and randomizing or directing agents, i.e. polar modifiers. All of these reaction parameters affect the aggregation state of the initiator and the living polymer anion-cation pair.

The nature of the lithium-ion pairs regulates the initiation, propagation, monomer cross-over reactions, polymerization rate and mode of butadiene enchantment. As discussed below, ion pairs can be described in order of increasing reactivities as aggregated, solvent separated and separated ion pairs. Polar modifiers and randomizing agents lead to separated ion pairs. Consequently, nearly random copolymers with high 1,2-vinyl groups are formed provided both monomers are present during polymerization. Styrene markedly alters the state of ion pairing and acts as a non-polar solvent for butadiene.

In non-polar solvents, intimate ion pairs exist as aggregates and in the form of reverse micelles. When these ion pairs are combined with butadiene, poly (1,4-butadiene) having less than 50 wt % 1,2-vinyl groups is formed. During the reaction, "straw-yellow" anions are observed.

When sodium alkoxide salts are added to non-polar solvents, the intimate ion pairs are converted to solvent-separated ion pairs. Polybutadiene having between 50 and 80 wt % 1,2-vinyl groups is formed when these solvent-separated ion pairs are combined with butadiene. During this reaction, orange anions are observed.

Separated ion pairs are formed when Lewis bases or polar modifiers are added to non-polar solvents. When these separated ion pairs are added to butadiene, polybutadiene having between 60 and 100 wt % 1,2-vinyl groups is formed. During this reaction, muddy brown anions are observed, especially when di-initiators are used. Different colors are apparent when mono-initiators and di-initiators are used to carry out the polymerization. Separated ion pairs may be converted to solvent-separated ion pairs and ultimately to intimate ion pairs by adding Lewis acids to the solution.

Aggregation and the nature of the initiator ion pairs are very important for n-butyllithium initiated styrene polymerization in cyclohexane. Because n-butyllithium exists as a hexamer in hydrocarbons, the molecular weight of the polystyrene obtained is six times greater than the calculated number average value based on the number of grams of monomer per mole of initiator. The effects of aggregation are best demonstrated when attempts are made to form block copolymers. When styrene is added to n-butyllithium, one-sixth of the available initiator reacts to form living polystyrene with six times the theoretical number average molecular weight, under the conditions used in Trial 1. When butadiene is then added, living polystyrene-block-polybutadiene is formed. Then, when more styrene is added, about two-thirds of the unreacted aggregated n-butyllithium reacts preferentially to form polystyrene. The expected triblock polymer, polystyrene-polybutadiene-polystyrene, is not formed. When yet more butadiene is added, butadiene is distributed between the various living polymers and a mixture of mostly diblock copolymers results. Between 6 and 8 sequential additions of styrene and butadiene are required to consume the remaining unreacted aggregated n-butyllithium catalyst before a monomodal product is produced with a polydispersity (Mw/Mn) near 1.6.

The 1,2-vinyl content increases during the sequential monomer additions from 50 to 70%. We believe this happens because monomers were dried over sodium hydride and not distilled to remove sodium salts. Sodium salts like those derived from BHT are polar modifiers and influence the polymerization reaction. Reaction rates accelerate markedly after 6 to 8 monomer additions and increased 1,2-vinyl contents are indicative of a more reactive, i.e. less aggregated, ion pair. Other salts are expected to behave similarly. The above example involves a reaction using 10 ml of 1.6 molar n-butyllithium with 34 ml styrene and 13($\pm$1)g butadiene in 70 ml cyclohexane added incrementally to form a (polystyrene-polybutadiene)$_5$ polystyrene multi-block copolymer in cyclohexane to maintain about 10 wt % solids in cyclohexane.

In a hydrocarbon solvent, butadiene without polar modifiers homo-polymerizes more slowly than does styrene. Under typical polymerization conditions, using a reaction medium containing mononomer leading to 20 wt % solids, n-butyllithium initiator, and cyclohexane at 25° C. butadiene requires 4 hours or more to react completely. However, styrene homo-polymerizes within 1 hour under the same conditions. At 50° C., butadiene homo-polymerization is markedly accelerated and complete butadiene reactions takes about 1 hour. Approximately 80% or more of the butadiene is enchained in the 1,4-conformation. At monomer to initiator molar ratios approaching 10, approximately 60% of the butadiene is enchained in the trans-conformation. When monomer to initiator molar ratios are in excess of 10, cis and trans butadiene conformers are formed in nearly the same amounts in the polymer.

When styrene and butadiene are copolymerized with an organolithium initiator in a hydrocarbon solvent, styrene appears to initiate first as evidenced by red polystyryl anion. Butadiene then polymerizes substantially more rapidly than styrene does, even if styrene is present in higher concentrations. The result is a graded or segmented block copolymer with mostly 1,4-butadiene enchantments. By contrast, polar modifiers tend to produce polymers with nearly random monomer distributions and high 1,2-vinyl contents.

Polar modifiers, directing agents, activating agents and randomizing agents are not necessarily equivalent terms. For example, a randomizing agent produces a random copolymer by definition, but it does not necessarily have to be a directing agent (i.e., to direct the butadiene stereochemistry in the polymer chain). For the purpose of this invention, we use the terms interchangeably because the randomizing agents used in the present invention also direct butadiene insertion in the copolymer to more than 50% 1,2-vinyl regio-stereoisomer. Random copolymers are usually identified by sharp glass transition temperatures, as determined with differential scanning calorimetry.

Tetrahydrofuran is a polar modifier, a 1,2-vinyl butadiene director and a randomizing agent in that styrene and butadiene are interchangeable in the polymerization reaction. Sharp glass transition temperatures and high 1,2-vinyl contents are measured in the copolymers formed.

TMEDA and DPE are polar modifiers (i.e., they change the aggregation state of the anions by complexation) and they are also 1,2-butadiene directors and randomizing agents in hydrocarbon solvents.

By contrast, potassium t-butoxide is reported to be a randomizing agent but not a directing agent in hydrocarbon. See C. F. Wofford, U.S. Pat. No. 3,294,768. Styrene and butadiene are reported to be freely interchangeable in the copolymerization in the presence of this reagent; however, the 1,2-vinyl content is not increased markedly by this reagent.

BRIEF DESCRIPTION OF THE DRAWINGS

The invention will be described with reference to the accompanying drawings, wherein.

DESCRIPTION OF THE PREFERRED EMBODIMENTS

Figure 1:
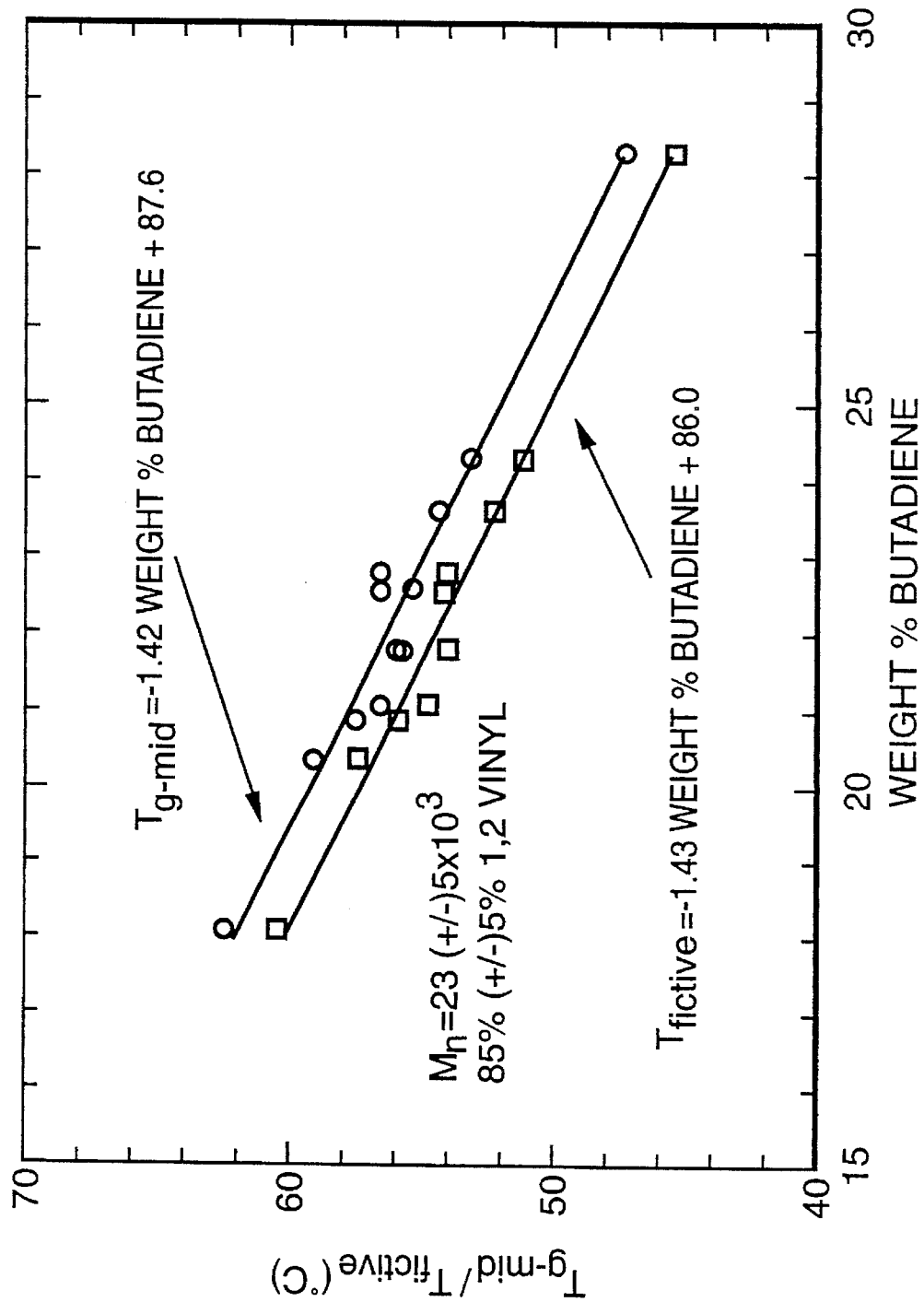
FIG. 1 is a plot of the copolymer Tg as a function of butadiene copolymer concentration (wt. %)

Reference will now be made in detail to the present preferred embodiments of the invention. In the examples and throughout the specification and claims, all parts and percentages are by weight unless otherwise specified.

As noted above, a first embodiment of the present invention comprises a solution polymerization process for producing an organic polymer from styrene and at least one other polymerizable monomer comprising providing a liquid reaction medium suitable for conducting the polymerization, wherein the reaction medium contains styrene and a polymerizable monomer other than styrene; and anionically polymerizing the styrene and other monomer, thereby forming random copolymer chains, wherein the total quantity of the styrene used in the polymerization is at least 50% by weight based on the total weight of styrene and other polymerizable monomers used in the polymerization.

A preferred embodiment further comprises adding a randomizing agent to the reaction medium prior to or during the polymerization. The randomizing agent is preferably selected from N,N,N',N'-tetramethylenediamine, tetrahydrofuran, 1,2-dipiperidinoethane and butylated hydroxy toluene. The polymerizable monomer is preferably butadiene or isoprene, and is more preferably butadiene.

A preferred embodiment of the present invention relates to the use of polar modifiers as randomizing agents to control butadiene stereochemistry and insertion into the polymer chain. The anionic polymers and toners produced are comparable with or superior to those of conventional toner materials.

As noted above, preferred randomizing agents include THF, TMEDA and DPE. Appreciable amounts of THF are preferably used in a hydrocarbon solvent to produce styrene-butadiene copolymers having a high 1,2-vinyl content. The solvent is preferably cyclohexane. Pure THF can also be used. In a preferred embodiment, up to 25 vol % THF in cyclohexane is used to obtain a 75 wt % styrene/25 wt % butadiene copolymer with 85% 1,2-vinyl groups. In cyclohexane without added THF, catalytic amounts of TMEDA and DPE also allow the formation of nearly random anionic styrene-butadiene copolymers with greater than 60% 1,2-vinyl groups. The total number of moles of randomizing agent used is preferably at least equal to the number of moles of initiator used.

In a preferred embodiment, certain alkali metal alkoxide salts such as the sodium salt of butylated hydroxy toluene (BHT) are used to polymerize butadiene in, e.g., cyclohexane, thereby forming a polymer having between 50 and 70% 1,2-vinyl groups.

The process preferably further comprises finely dividing the copolymer into particles and incorporating the particles into a composition for use as a toner. A suitable method for producing a toner from a copolymer is described in U.S. Pat. No. 4,469,770, the disclosure of which is incorporated herein by reference.

A second embodiment comprises a copolymer made by the above-described method. The copolymer preferably has a high 1,2-vinyl content and a narrow molecular weight distribution. The copolymer preferably has a number average molecular weight of less than 150,000, and more preferably between 10,000 and 50,000. The copolymer preferably has a glass transition temperature of less than 60° C. and more preferably between 25° and 60° C.

With TMEDA and 1,2-dipiperidinoethane (DPE) and at a reaction temperature of between −5° and 0° C., the polymerization is preferably terminated after about 1 hour in order to avoid chain coupling, which can lead to an increase in molecular weight and increased polydispersity. The most desirable reaction time will vary with reaction temperature. The reaction temperature should be above the freezing point of the solvent system used, and below the point at which the solvent and/or monomers boil. However, by using a pressurized reaction vessel, substantially higher temperatures can be used. At these higher temperatures, the total reaction time can be on the order of minutes or seconds. For styrene-butadiene polymerizations at atmospheric pressure, a temperature of between −5° and 0° C. is generally preferred.

The reaction product is preferably removed from the reaction medium shortly after termination of the reaction. This prevents problems associated with cross-linking.

The molecular weight, polymer composition and butadiene microstructure are preferably carefully controlled in order to produce superior anionic resins. These resins may be used to produce toners that demonstrate advantageous properties such as low fusing temperature, broad fusing latitude, gloss control of fused toner images, good processability, excellent tribo-electrical properties and good anti-blocking behavior. The molecular weight can be controlled by controlling the ratio of initiator to monomer. For example, a copolymer having a number average molecular weight of between 150,000 and 10,000 can be prepared by using an initiator concentration between $6.7 \times 10^{-4}$ and $1.0 \times 10^{-2}$ moles per 100 grams of monomer. The polymer composition and butadiene microstructure can be controlled through the use of randomizing agents.

A third embodiment comprises a process for forming a toner, wherein the process comprises providing a liquid reaction medium suitable for conducting a solution polymerization, the reaction medium containing at least two polymerizable monomers; anionically polymerizing the monomers, thereby forming random copolymer chains; finely dividing the copolymer into particles; and incorporating the particles into a composition for use as a toner. The copolymer is preferably made by using the above-described process of the first embodiment, and is more preferably made in accordance with the preferred embodiments of the above-described process.

Figure 2:
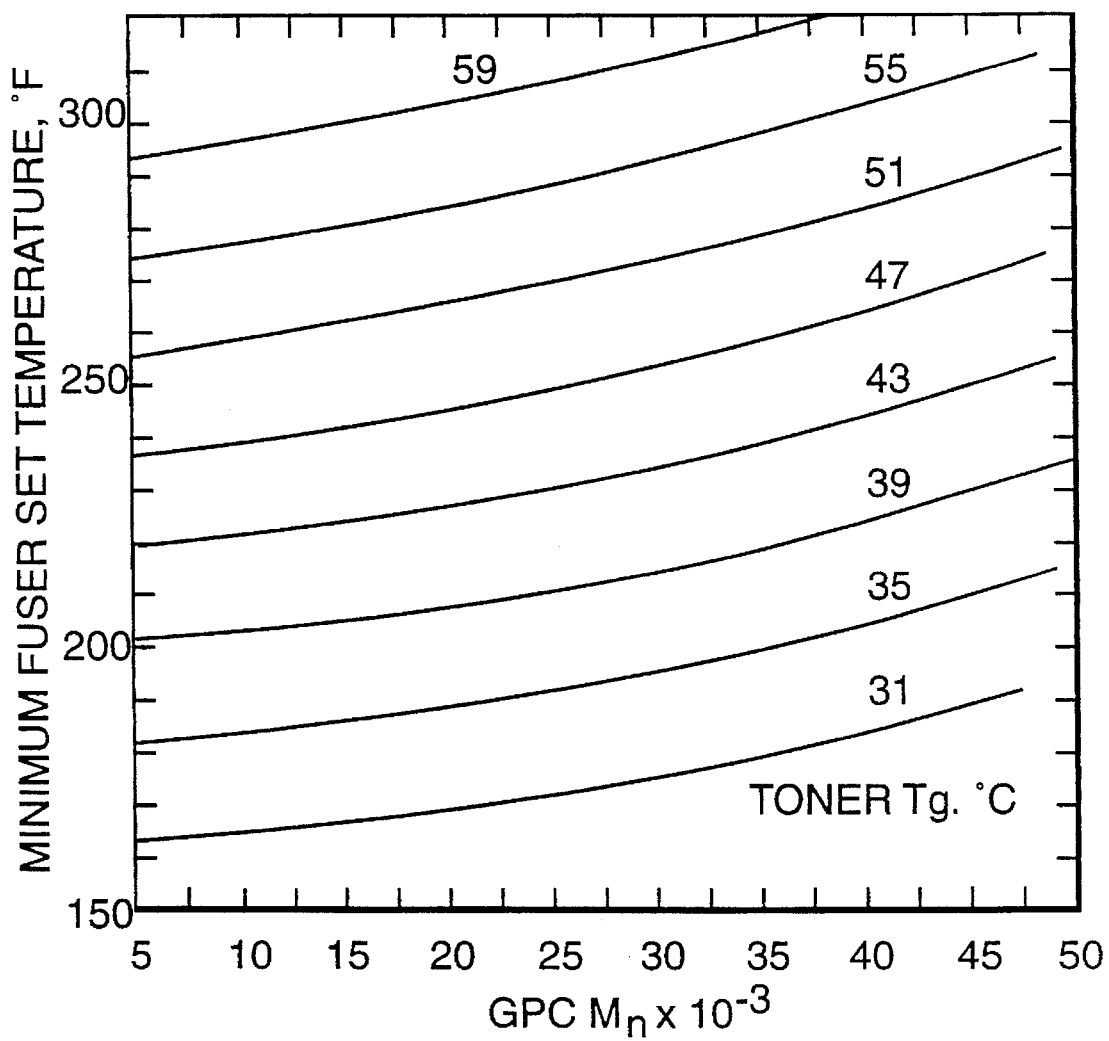
FIG. 2 is a plot of fusing temperature (minimum fix temperature) against toner polymer molecular weight as a function of Tg; and, FIGS. 3A and 3B illustrate, respectivly, tape and crease tests.

A fourth embodiment comprises a toner made by the above-described method. For toner applications, we prepared and optimized anionic copolymers of styrene and butadiene using polar modifiers in a hydrocarbon polymerization solvent. The glass transition temperatures, molecular weights, polymer mechanical properties and melt viscosities have been optimized for improved toner performance in development, fusing and fix behavior. The fusing temperature of the toner is dependent on Tg predominantly and secondarily on molecular weights, for copolymer number average molecular weights less than 40,000. FIG. 2 is a plot which illustrates the relationship between the fusing temperature, the glass transition temperature, and the molecular weight.

For two component development and roll fusing, copolymers with weight average molecular weights between 20,000 and 60,000 have sufficient strength, mechanical properties and fusing latitudes to warrant their use as xerographic toners. Up to 20 wt. % 100,000 Mw copolymer has been added to improve fusing latitude and mechanical properties of lower molecular weight Mw-20,000 copolymers in polymer blends. The addition of 10 wt. % Mw-100,000 copolymer in a 20,000-Mw blend appears to be an optimum value, however. For radiant, non-contact fusing systems, lower molecular weight copolymers will be acceptable. For high-pressure fusing systems operating at greater than 200 psi and preferably near 2000 psi, copolymers with molecular weights higher than 60,000 can be used in toners.

For most typical applications, optimum copolymers will have Tg values near 50° C., although toner applications have been devised which allow Tg 35° C. materials to be useful in toners.

A fifth embodiment comprises a solution polymerization process for producing an organic polymer, which comprises providing a liquid reaction medium suitable for conducting the polymerization, the reaction medium containing a randomizing agent, styrene and a polymerizable monomer other than styrene and wherein the total quantity of the styrene used in the polymerization is at least 50% by weight based on the total weight of styrene and other polymerizable monomers used in the polymerization; and, anionically polymerizing the monomer and the styrene, wherein a difunctional initiator is used to initiate the polymerization. In this fifth embodiment, the initiator is preferably an organolithium compound, the liquid reaction medium preferably comprises cyclohexane, and the randomizing agent is preferably selected from N,N,N',N'-tetramethylenediamine, tetrahydrofuran and 1,2-dipiperidinoethane.

All indications so far are that random, nearly random and/or very short blocks are the best materials for toners. As noted above, the aggregation state of the initiator and the monomer sequence distributions and structure of the butadiene component in living polymers can be affected by the mode of monomer addition, segment concentration, solvent, initiator, temperature, stirring rate, and randomizing or directing agents, i.e. polar modifiers. Preferred examples of each of these parameters are discussed below.

The preferred monomers are styrene and butadiene. The preferred mode of monomer addition is to combine both styrene and butadiene and add the monomers together to initiator (or living polymeric anions) in the presence of an activator or randomizing agent so that random or nearly random copolymers are formed.

The best segment concentration is a balance of monomers sequences to maintain a specific glass transition temperature (Tg), preferably greater than 25° C. but less than 60° C., and most preferably near 50° C. To accomplish this, specific 1,2-vinyl contents and molecular weights are usually established arbitrarily, while the wt. % butadiene in the copolymer is varied experimentally. The plot shown in FIG. 1 allows one to predict copolymer Tg as a function of wt. % butadiene copolymer concentration at 85±5% 1,2-vinyl groups and number average molecular weights of about 23,000. In FIG. 1, $T_{g\text{-}mid}$ is the middle glass transition temperature and $T_{fictive}$ is the true glass transition temperature. It is best if a continuous sequence of styrene segments is less than 50 repeat units and preferably less than 30 repeat units in sequence length. A plot of fusing temperature (minimum fix temperature) against toner polymer molecular weight as a function of Tg is shown FIG. 2. FIG. 2 allows a crude approximation of the lowest fusing temperature for a Xerox 5028 silicone roll fuser operated at 3 inches per second and a toner made with styrene and butadiene copolymer of known Tg and molecular weight.

The preferred solvent is probably benzene but this has been excluded for health reasons, since there has been a correlation between benzene and leukemia. Therefore, our preferred solvent is cyclohexane with activators and randomizing agents. Sufficient THF (tetrahydrofuran) and/or activating agent (DPE or TMEDA) is then added to produce copolymers with the appropriate % 1,2-vinyl groups and the desired glass transition temperature. For high % 1,2-vinyl contents (>85%), the best solvent system is tetrahydrofuran, or mixtures of cyclohexane and tetrahydrofuran. Hexane-tetrahydrofuran combinations are generally poorer solvents for the copolymers compared with cyclohexane-tetrahydrofuran mixtures. For monomodal copolymers with about 67% 1,2-vinyl groups and more than 50 wt. % styrene, a molar ratio of DPE and/or TMEDA to lithium alkyl of at least 2 to 1 is effectual in pure cyclohexane. Note that activation of lithium alkyls by TMEDA or DPE results in copolymers that undergo a competing chain-coupling reaction with time. Reactions should be terminated within 1 hour and should be worked-up to isolate the copolymers immediately to prevent side reactions from taking place, if predicted molecular weights are desired to be obtained. The claim coupling side reactions are desirable if polymers with wide molecular weight distributions are wanted for specific uses, for example, to improve the fusing latitude of toners. The chain coupling side reaction (with time) is not an apparent side reaction when tetrahydrofuran-cyclohexane mixed solvents are used to carry the copolymerizations with DPE and TMEDA.

Initiator selection is crucial because the initiator determines molecular weight, modality, molecular weight distribution, vinyl content, and block sequence. Some of the preferred initiators are described below.

Sec-butyllithium (a tetramer-in-hydrocarbon) is an acceptable initiator for styrene and butadiene copolymers in hydrocarbon media (e.g., hexanes, cyclohexane and benzene). It is too reactive for use in mixed solvent systems containing tetrahydrofuran with which it reacts. Its use with TMEDA and DPE in cyclohexane is described in Trial 9. Sec-butyllithium reacts quantitatively with α-methyl styrene to produce a highly colored red initiator which is acceptable for use in mixed solvents of hydrocarbon and tetrahydrofuran. Sec-butyllithium-α-methyl styrene adduct is useful as a colored substitute for n-butyllithium described next, an can be used in tetrahydrofuran containing solvents.

n-Butyllithium (hexamer in hydrocarbons) gives monomodal copolymers with dispersities between 1 and 2; however the copolymer produced depends on the aggregation state of the n-butyllithium, which is dictated by solvent polarity and activating agents such as TMEDA and DPE. Tetrahydrofuran mixed solvent systems have been studied by us and cyclohexane/tetrahydrofuran is preferred over hexanes/tetrahydrofuran with n-butyllithium. The use of sec-or n-butyllithium with tetrahydrofuran, TMEDA or DPE to produce styrene-butadiene copolymers with more than to 50 wt. % styrene is one of the preferred aspects of this invention. Of special significance is the application of these materials in Xerographic toners.

n-Butyllithium-α-methylstyrene adduct is a useful colored mono-initiator which can be used as a substitute for n-butyllithium or sec-butyllithium-α-methyl styrene adduct. All can be used with tetrahydrofuran. Lithium/naphthalene is an excellent di-initiator for styrene-butadiene copolymerizations in solvent systems containing tetrahydrofuran. Monomodal resins with dispersities near 1.2 are formed. This di-initiator can be used to produce copolymers with more than 85% 1,2-vinyl groups dependent on THF to cyclohexane ratio, n-butyllithium, n- or sec-butyllithium-α-methyl styrene adduct, and 2 to 1 molar sec-butyllithium-diisopropenyl benzene adduct (a di-initiator) can be used with THF; however, the microstructure and end groups of the resulting polymer can vary appreciably, dependent on whether a mono-initiator or di-initiator is selected. An adduct made by adding 2 molar equivalents of sec-butyllithium per mole of diisopropylbenzene gives, under the best conditions (high tetrahydrofuran concentrations), monomodal copolymers with a polydispersity (Mw/Mn) of 1.6 or greater (usually 2). At lower THF concentrations, copolymers are usually trimodal with a polydispersity greater than 2. This di-initiator is best suited to produce high 1,4-polybutadiene polystyrene SBS block copolymers in hydrocarbon by sequential monomer additions. Some examples of the use of this di-initiator with TMEDA and DPE are presented in Trial 10. The production of copolymers with more than 50 wt. % styrene is another preferred embodiment of this invention. 1,2-vinyl contents in resultant copolymers are usually less than 70% under the reaction conditions tried in pure cyclohexane with DPE and TMEDA activating agents. A number of lithium-amides can also be used to initiate styrene-butadiene copolymerizations.

Stirring rate should be sufficiently vigorous to ensure good mixing of reagents, otherwise multimodal copolymers with broad molecular weight distributions are formed. Stirring rates near 100 revolutions per minute are adequate.

EXAMPLES

Toner Fabrication and Evaluation

The following procedures and apparatus were used to evaluate polymers produced in accordance with the following examples of the present invention. A small toner processing facility was assembled to prepare and evaluate small quantities of toner. A CSI mini-laboratory extruder was used to extrude polymers with 6 wt % Regal 330 carbon black and 2 wt % TP-302 (Nachem). The extrudate was chopped using an Aldrich lab mill and Jetted to produce particles having a diameter of 8 to 11 microns by using a Trost T Jet Mill (Garlock Ind.). The resultant toner was milled with 2 wt % aerosol R972 using the Aldrich lab mill and rolled at 3.3 wt % toner/carrier concentrations against 60/40 Kynar-polymethyl methacrylate coated steel shot. Triboelectric properties were measured for the resultant developers with standard Faraday cage apparatus. Triboelectric charges of between 10 and 25 microcoulombs per gram were typically measured. Images were developed using a Xerox™ Model D photocopier or with a deposition device consisting of two charged parallel plates, i.e. a capacitor, with paper taped to the cathode. Toner and carrier were cascaded directly over the paper. The voltage was typically around 1400 V. Images were fused using a Xerox™ 5028 silicone roll fuser operated at three inches per second. The minimum fix temperature was the fuser set temperature required for fused images to remain resistant to a Scotch tape peel test and crease according to an internal Xerox fix standard.

Figure 3B:
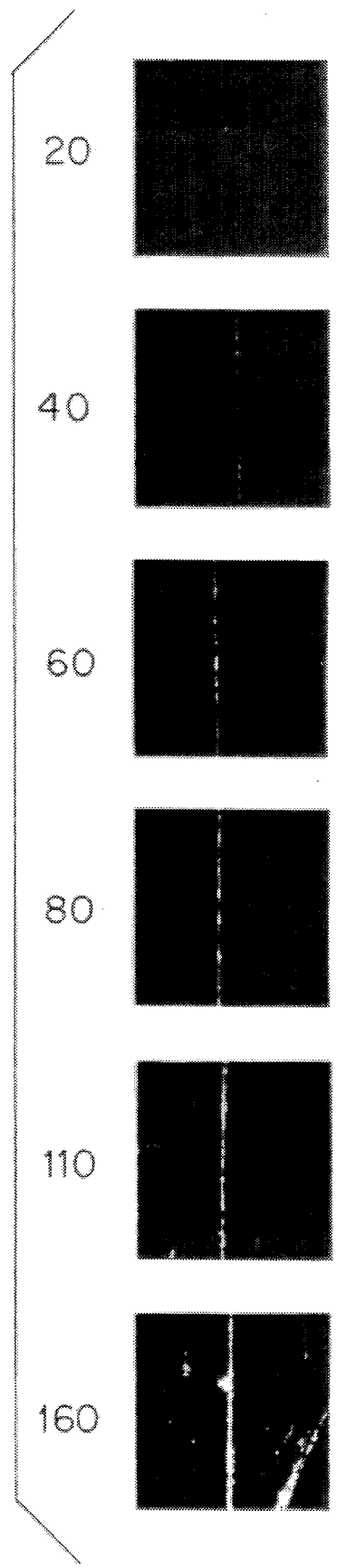
Figure 3A:
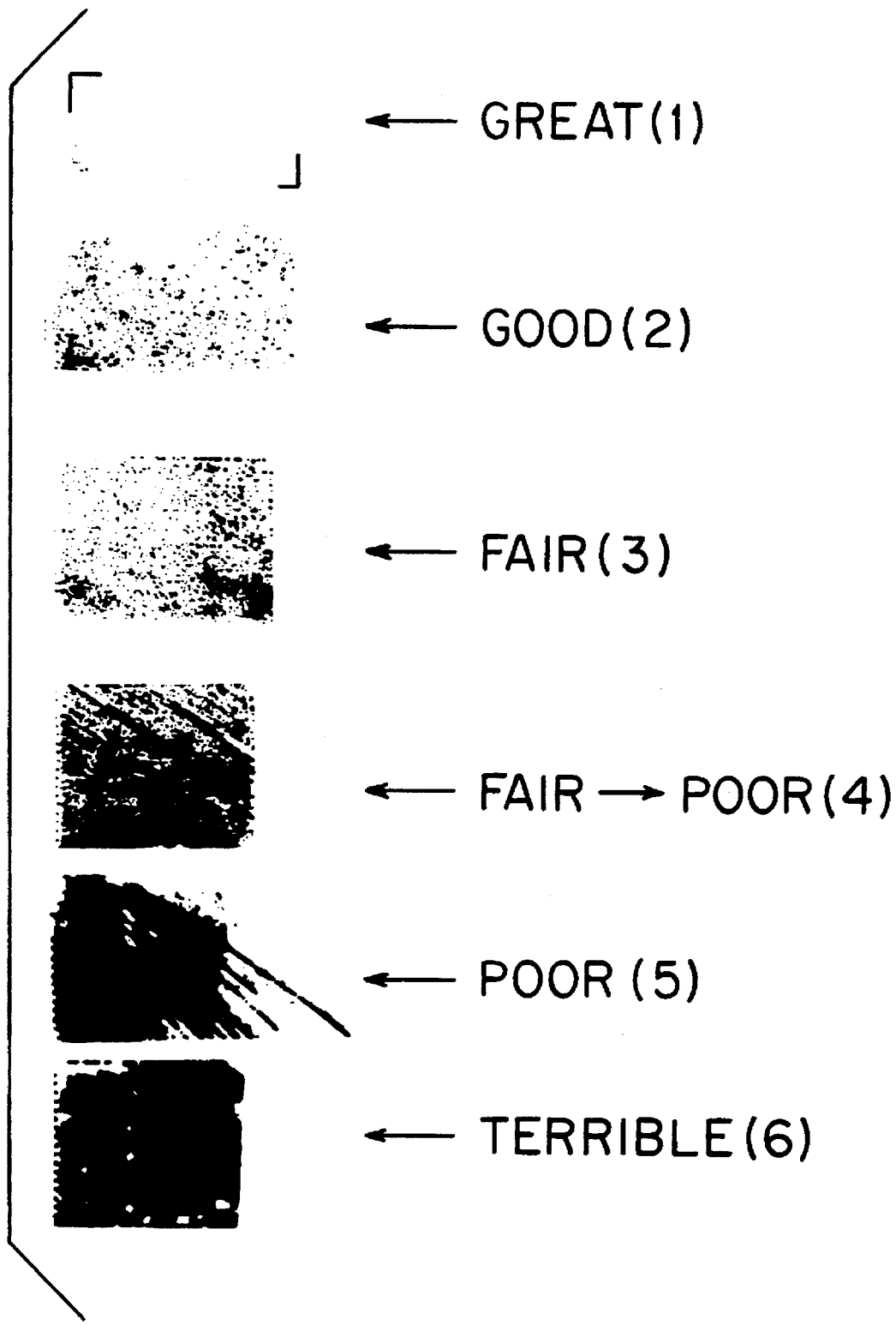

FIGS. 3A and 3B illustrate, respectively, the tape and crease tests. The tape test involves affixing Scotch Brand Tape™ to the image and then removing it. The amount of toner removed by the tape is then used to measure the fix level of toner to the paper. In general, tape test level 3 is chosen as the minimum fix temperature.

The crease test involves folding a solid xerographic area print by 180° in the direction of the image. The crease area is then compared with the standard shown in FIG. 3B. In general, a crease of between 20 and 80 can be selected as the minimum fix temperature. The maximum acceptable crease varies somewhat with the type of fuser used, since the fuser affects the outcome of the test. For a 1075 Viton fuser operated a 11 inches/second, the maximum acceptable crease is taken to be about 65. However, for a Cheyenne 5028 silicon soft roll fuser operated at 3.3 inches/second, the maximum acceptable crease is taken to be about 20.

Trial 1. Preparation of Styrene-Butadiene Copolymers with 69 wt % 1,2-Vinyl Groups with Certain Salts of Butylated Hydroxy Toluene and n-Butyllithium A block polymer with eleven segments was prepared by the following method. Styrene and butadiene were stored over sodium hydride and argon but otherwise were used as received. Styrene (34 ml, 30.4 g) and then butadiene (20 ml, $13^{\pm}1$ g) in 70 mls cyclohexane were each added sequentially at 7 hour ($^{\pm}1$ hour) intervals to a reaction mixture comprising 10 ml of 1.6 molar n-butyllithium in hexane and 200 ml cyclohexane. The six additions of styrene and five additions of butadiene were completed in 3.2 days. The resulting orange-red solution was treated dropwise with about 5 ml of methanol and the colorless solution that resulted was then concentrated using a rotary evaporator. The concentrate was added to methanol and dry ice in a Waring blender to precipitate the polymer. The polymer was collected by filtration, washed with methanol and vacuum dried to constant weight. The yield was quantitative.

Gel permeation chromatography (GPC) was used to evaluate the polydispersity. Polydispersity is generally measured by determining the ratio of the weight average molecular weight to the number average molecular weight (Mw/Mn). In the present example, this ratio was found to be 63000/31048. The glass transition temperature was measured by Differential Scanning Calorimetry (DSC) and was determined to be approximately 50° C. $^1$H NMR analysis was used to determine that the butadiene content of the polymer was 23.8 wt % with 69% 1,2-vinyl groups.

GPC and NMR analyses of the samples extracted from the reaction medium at the specified times were used to provide the following data: first styrene addition: 20500/11900; second butadiene addition: 24300/17300 (13 mol % butadiene, 50.1% 1,2-vinyl); third styrene addition: 29725/25702; 15637/7764, 6766/5400 (22.1 mol % butadiene, 56.5% 1,2 vinyl); fourth butadiene addition: 18289/10774, 9004/7694, 32299/28268 (38.1 mol % butadiene, 61.5% 1,2-vinyl); fifth styrene addition: 28680/13311 (30.5 mol % butadiene, 64.4% 1,2-vinyl); sixth butadiene addition: 27996/15754 (40 mol % butadiene, 61.7% 1,2-vinyl); seventh styrene addition: 33200/19600 (33.7 mol % butadiene, 64.8 % 1,2-Vinyl), eighth butadiene addition: 37400/22768; ninth styrene addition: 43700/27400 (50 mol % butadiene, 59.4 % 1,2-vinyl); 10th butadiene addition: 51500/29700

(51.3 mol % butadiene, 65.6 % 1,2-vinyl); 11th styrene addition: 63000/31050 (37.5 mol % butadiene, 23.8 wt % butadiene, 69% 1,2-vinyl).

The polymer after melt extrusion with 6 wt % Regal 330 and 2 wt % TP-302 charge control agent was readily jettable into toner and showed a minimum fix temperature (MFT) at 245° F. (fuser set temperature). The hot offset temperature was 325° F. The fuser was a Cheyenne 5028 soft silicon roll operated at 6 inches per second. The glass transition temperature was 40.5° C. (DSC).

The block copolymer produced in Trial 1 is suitable for use in toners; however, the blocking temperature of the toner is less than 50° C. The Tg of the copolymer produced in Trial 1 is 40° C., and that of the toner is 40.5° C. Toner made with 6 wt. % Regal 330 carbon block (cabot), 1.5 wt. % TP-302 charge control agent (Nachem), and Trial 1 copolymer, was used to make more than 3300 photocopies using a Xerox 5028 photocopier with a silicone roll fuser set at 260° F. and operated at 6 inches per second (30 copies per minute). The normal fuser set point for this copier is 350° F. The hot offset temperature (or the highest useful fuser temperature under the conditions used) was 325° F. for Trial 1 toner.

Trial 2. Preparation of Random 83.1 wt % Styrene/16.9 wt % Butadiene Copolymer n-Butyllithium (12.3 ml of a 1.6 molar solution in hexane) was added to 100 ml tetrahydrofuran at −30° C. To this mixture was added styrene (33 ml) and butadiene (13 ml, 7.8 g) in 87 ml cyclohexane. The resulting solution was allowed to warm to 25° C. with continued stirring for 16 hours. The resulting polymer was precipitated into methanol using a Waring blender, collected by filtration, washed with methanol and then vacuum dried. The polymer contained 16.9 wt % butadiene with 98.3% 1,2-vinyl groups. The DSC glass transition temperature was 50.6° C. The GPC Mw/Mn was 12,600/9,400. The polymer was melt mixed with 6% Regal 330 and then micronized to form toner. The minimum fix temperature of the resultant toner was 235° F. and the hot offset temperature was 295° F. based on the fuser set temperature.

Trial 3. Preparation of 77.5 wt % Styrene/22.5 wt % Butadiene Copolymer with 79% 1,2-Vinyl Groups Using Tetrahydrofuran/Cyclohexane Cosolvent.

A five liter, three neck round bottom flask apparatus with mechanical stirrer and argon inlet was charged with cyclohexane (500 ml), 1,3-diisopropenyl benzene (4.55 g), and then 1.3 molar sec-butyllithium (45 ml). The resulting mixture was heated four hours at 50° C. More cyclohexane (390 ml) was then added. Tetrahydrofuran (390 ml) was then added. After cooling the mixture to −10° C., a solution of styrene (102.5 ml, 92.35 g), butadiene (37.5 ml, 22.8 g), tetrahydrofuran (72.5 ml) and cyclohexane (72.5 ml) was added over four minutes. After eight minutes, a solution of styrene (85.53 ml, 75.3 g), butadiene (49.89 ml, 31.7 g), tetrahydrofuran (71.8 ml) and cyclohexane (71.8 ml) was added over four minutes. After 30 minutes more, a solution of styrene (85.5 ml, 75.3 g) butadiene (49.8 ml, 31.7 g), tetrahydrofuran (72 ml) and cyclohexane (72 ml) was added over four minutes. After another 30 minutes, a solution of styrene (85.5 ml), butadiene (49.8 ml), tetrahydrofuran (72 ml) and cyclohexane (72 ml) was added over four minutes. After 30 minutes more, a solution of styrene (103 ml), butadiene (37.5 ml), tetrahydrofuran (72.5 ml) and cyclohexane (72.5 ml) was added. After an additional 30 minutes had passed, styrene (17 ml, 15.4 g) was added. After 4 hours, the reaction returned to 25° C. and stirring at 25° C. was continued for 12 hours. Isopropanol (20 ml) was added and the reaction became colorless. The polymer was isolated by precipitation into 2-propanol, and then reprecipitation into 2-propanol from a 20 wt % solution in methylene chloride. A final reprecipitation from 20 wt % solids in methylene chloride into methanol yielded a white powder. The powder was isolated by filtration, washed with methanol, and then vacuum dried. The product formed was a 77.5 wt % styrene/ 22.5 wt % butadiene copolymer with 78.7% 1,2-vinyl groups. The GPC Mw/Mn was 464,600/187,500. The distribution was trimodal. The glass transition temperature was between 50 and 53° C. (DSC).

Trial 4. Preparation of 76.9 wt % Styrene/23.1 wt % Butadiene Copolymer With 60% 1,2-Vinyl Groups Using Tetramethylene Diamine/2 sec-Butyllithium-Diisopropenyl Benzene Adduct.

A 5-liter, 3 neck round bottom flask equipped with mechanical stirrer and argon inlet was charged with cyclohexane (1 liter), 1.3 molar sec-butyllithium (38 ml) and 1,3-diisopropenyl benzene (3.68 g). The reaction was heated to 50° C. for 4 hours. More cyclohexane (2 liters) was then added. Tetramethylene diamine (14 ml, 10.78 g, 0.0928 mol) was added by using a syringe. After cooling to 0° C., a solution of styrene (82 ml, 73.63 g), butadiene (30 ml, 19.71 g) and cyclohexane (115 ml) was added over four minutes. After 30 minutes passed, a solution of styrene (66.8 ml, 60.35 g), butadiene (40.1 ml, 25.4 g) and cyclohexane (115 ml) was added over 4 minutes. After an additional 30 minutes, a solution of styrene (67 ml), butadiene (40.1 ml) and cyclohexane (115 ml) was added. After another 30 minutes, a solution of styrene (67 ml), butadiene (40 ml) and cyclohexane (115 ml) was added. After another 30 minutes, a solution of styrene (82 ml), butadiene (30 ml), and cyclohexane (115 ml) was added. After another 30 minutes, styrene (14 ml, 13.57 g) was added. The reaction was allowed to warm to 25° C. and stirring was continued for 16 hours. Isopropanol (20 ml) was added and the reaction medium turned colorless. The polymer solution was precipitated into 2-propanol. The solids were redissolved in methylene chloride at 20 wt % solids and then were reprecipitated into isopropanol. One final reprecipitation from a 20 wt % solids solution from methylene chloride into methanol yielded a white powder. After filtration and washing with methanol, the polymer was vacuum dried. The product was a 76.9 wt % styrene/23.1 wt % butadiene copolymer with 60% 1,2-vinyl groups. The GPC Mw/Mn was 64,000/33700. The distribution was trimodal. The calculated Mn was 39000.

Trial 5. Preparation of Styrene-22 wt % Butadiene Copolymer with 79% 1,2-Vinyl Groups Using Dipiperidinoethane and 2-sec-Butyllithium/ Diisopropenyl Benzene Adduct.

A 5 liter three neck round bottom flask equipped with mechanical stirrer and an argon inlet was charged with cyclohexane (500 ml), 1.3 molar sec-butyllithium (38 ml) and 1,3-diisopropenyl benzene (3.69 g). The solution was heated four hours at 50° C. More cyclohexane (2.5 liters) was added. The reaction mixture was cooled to −20° C. and dipiperidinoethane (20.5 ml, 18.56 g) was added. A solution of styrene (82 ml, 74.3 g), butadiene (30 ml, 19.7 g) and cyclohexane (115 ml, 87.35 g) was added. After 30 minutes more, a solution of styrene (66.7 ml, 60.16 g), butadiene (40 ml, 25.8 g) and cyclohexane (115 ml, 88.2 g) was added over 4 minutes. After another 30 minutes, a solution of styrene (67 ml), butadiene (40 ml), and cyclohexane (115 ml) was added over 4 minutes. After yet another 30 minutes, a solution of styrene (67 ml), butadiene (40 ml), and cyclohexane (115 ml) was added. After another 30 minutes, a solution of styrene (82 ml), butadiene (30 ml) and cyclohexane (115 ml) was added over 4 minutes. After yet another 30 minutes, styrene (14 ml, 12.72 g) was added. Stirring at a temperature of −20° to 0° C. was continued for 2 more hours and the reaction mixture was stirred an additional 16 hours at 25° C. After isopropanol (20 ml) was added, the polymer solution was added to isopropanol to precipitate the polymer. The polymer dissolved at 20 wt % solids in methylene chloride was reprecipitated into isopropanol and then again from methylene chloride into methanol. The solids were collected by filtration, washed with methanol, and then vacuum dried. The product was a 78.1 wt % styrene/21.9 wt % butadiene copolymer with 78.5% 1,2-vinyl groups. A bimodal GPC distribution was observed. The 60% high molecular weight component Mw/Mn was 82,000/67,000. The 40% low molecular weight portion Mw/Mn was 23,700/20,900. The overall GPC Mw/Mn=61,700/37,700.

Trial 6. Preparation of 82 wt % Styrene/18 wt % Butadiene with 77% 1,2-Vinyl Groups using sec Butyllithium and 1,2 Dipiperidinoethane.

A 1-liter, 3 neck flask equipped with mechanical stirrer, thermometer and argon inlet was rinsed with 1.3 molar sec-butyllithium (20 ml) in cyclohexane followed by two 70 ml cyclohexane washes. The empty flask was then charged with cyclohexane (680 ml), 1.3 molar sec-butyllithium (1.76 ml) and 1,2-dipiperidinoethane (1 ml). The solution was yellow. Styrene (1.41 g) was then added dropwise at 0° C. to produce orange polystyryl anion. A solution of styrene (18 ml, 16.34 g), butadiene (4.5 ml, 2.27 g) and cyclohexane (22.5 ml, 17.3 g) was added over 2 minutes. After 1 hour more, a solution of styrene (44 ml, 39.2 g), butadiene (18 ml, 11.45 g) and cyclohexane (67 ml, 51.5 g) was added over 4 minutes. After yet another hour, a solution of styrene (18 ml), butadiene (4.5 ml) and cyclohexane (22.5 ml) was added. After yet another hour, styrene (1.44 g) was added. The reaction mixture was stirred for 30 minutes, and a 400 ml aliquot of the reaction was removed. This portion of the product was added to isopropanol to precipitate the product, followed by reprecipitation from methylene chloride into isopropanol and again into methanol. The product was filtered, methanol washed and vacuum dried. The product was a 65 wt % styrene/35 wt % butadiene copolymer with 66.4% 1,2-vinyl groups. The GPC Mw/Mn was 26,150/23,300. The distribution was monomodal. The glass transition temperature was 30° C. as measured by DSC. After 16 hours stirring at 25° C. the remaining portion of the reaction was worked-up by reprecipitation as before. The product was a 82 wt % styrene/18 wt % butadiene copolymer with 71.2 % 1,2-vinyl groups. The GPC Mw/Mn was 80400/59800. The product was monomodal with 5% low molecular weight and 5% high molecular weight tails. The Tg was 49° C. (DSC).

Trial 7. Preparation of 78.9 wt % Styrene/21.1 wt % Butadiene Copolymer with 78% 1,2-Vinyl Groups Using sec-Butyllithium and 1,2-Dipiperidioethane A 1-liter 3 neck flask equipped with mechanical stirrer, thermometer and argon inlet was washed with 1.3 molar sec-butyllithium (30 ml) in cyclohexane followed by two cyclohexane (95 ml) rinses. Cyclohexane (600 ml), 1.3 molar sec-butyllithium (1.76 ml) in cyclohexane and 1,2-dipiperidinoethane (12.5 ml) were added after cooling to 0° C. The reaction solution was yellow. Styrene (1.50 g) was added. A solution of styrene (18 ml, 16.57 g), butadiene (4.5 ml, 2.74 g), and cyclohexane (23 ml, 17.3 g) was added. After 1 hour more, a solution of styrene (44 ml, 40.08 g), butadiene (18 ml, 11.48 g), and cyclohexane (67 ml, 50.88 g) was added. After yet another hour, a solution of styrene (18 ml), butadiene (4.5 ml), and cyclohexane (23 ml) was added. After yet one more hour, styrene (1.43 g) was added.

After another 30 minutes reaction, a 400 ml aliquot was removed. A 65.3 wt % styrene/34.7 wt % butadiene copolymer with 76.8% 1,2-vinyl groups was isolated by precipitation into isopropanol followed by two reprecipitations from methylene chloride (20 wt % solids) into isopropanol and then methanol. The GPC Mw/Mn was 25400/21400. The distribution was monomodal. The Tg was 27° C. (DSC). After 16 hours, most of which was at 25° C. the reaction mixture became colorless. This indicates an absence of living anions. This portion of the reaction was further treated by reprecipitation as described before. A styrene-21.1-wt.%-butadiene copolymer with 77.5 % 1,2-vinyl groups was obtained with a GPC Mw/Mn=118000/71100. The molecular weight distribution was primarily monomodal with a 10% low molecular weight component having a GPC Mw/Mn=26300/24200. The Tg was 49° C. (DSC).

Trial 8. Preparation of 80.75 wt % Styrene/19.25 wt % Butadiene Copolymer with 67% 1,2-Vinyl Groups using sec-Butyllithium and Dipiperidinoethane.

A one-liter three neck flask equipped with mechanical stirrer, thermometer and argon inlet was rinsed with 1.6 molar sec-butyllithium (30 ml) in cyclohexane and was then washed with two 140 ml-cyclohexane rinses. Cyclohexane (500 ml), 1.3 molar sec-butyllithium (6.8 ml) in cyclohexane and dipiperidinoethane (1.0 ml) were added. Styrene (2.20 ml, 2.03 g) was then added dropwise. With cooling at 0° C., styrene (64 ml, 57.74 g), butadiene (15 ml, 9.60 g) and cyclohexane (100 ml) were added over 2 minutes. After 5.5 hours, 2-propanol was added and the reaction mixture became colorless. The solution was added to isopropanol using a Waring blender and the precipitated polymer was collected by filtration, washed with isopropanol and vacuum dried. The polymer dissolved at 20 wt % solids in methylene chloride was added to isopropanol to reprecipitate the polymer. After isolation by filtration, the polymer was redissolved in methylene chloride and reprecipitated into methanol. The polymer was filtered, washed with methanol and vacuum dried. A white powder was obtained which comprised a 80.75 wt % styrene/19.25 wt % butadiene copolymer with 66.7% 1,2-vinyl groups. GPC Mw/Mn =32400/29600. The distribution was monomodal. The Tg was 50° C. as determined by DSC. The yield was 52% of the theoretical value. A toner made with 6 wt % Regal 330 and 2% cetylpyridinium chloride had a minimum fix temperature at 265° F. and a hot offset temperature at 320° F., using a Cheyenne (Xerox™ 5028) fuser operated at 3.3 inches per second.

Trial 9. Reaction of 1,3-Butadiene with sec-Butyllithium and 1,2-Dipiperidinoethane after 1 hour and after 5 hours in cyclohexane.

A 1-liter, 3-neck round bottom flask equipped with a mechanical stirrer, thermometer, and septum was purged with argon. The reaction vessel was vigorously washed with 1.3 molar sec-butyllithium (10 ml) in cyclohexane (50 ml) and was then rinsed with cyclohexane (100 ml). To the empty reaction vessel were added cyclohexane (400 ml), 1.3 molar sec-butyllithium (1.75 ml) and 1,2-dipiperidinoethane (100 ml, 0.91 g). After cooling with a 2-propanol dry ice bath at −10° C., 1,3-butadiene (93.28g) in cyclohexane (300 ml, 229.6g) was then added over 7 minutes to the straw yellow solution at a temperature between −10 and 8° C. After 1 hour, a 200 ml aliquot was withdrawn from the reaction mixture and treated with 2-propanol (1 ml). After precipitation into 2-propanol, the recovered polymer was reprecipitated from methylene chloride (70 ml) into 2-propanol (700 ml) and from methylene chloride (70 ml) into methanol (800 ml). The yield of vacuum dried polymer was 2.64 g. The ¹H NMR spectrum of the polymer was consistent with poly-1,2-butadiene with 94.5% vinyl groups. The overall GPC Mw and Mn were 42,700 and 37,960, and the polymer was more than 90% monomodal. The calculated Mn was 41,000. More than 90% of the GPC trace was monomodal with Mw and Mn determined at 39,940 and 36,830. The remaining less than 10% of the GPC trace was Mw 92,230 and Mn 90,460. Apparently, some chain coupling had started to take place within 1 hour. After 5 hours of continued reaction, 2-propanol (1 ml) was added to the remainder of the reaction mixture and the solution turned from yellow to clear water-white. The reaction was added to 2-propanol (3 liters) to precipitate the polymer. After reprecipitation from methylene chloride (300 ml) into 2-propanol (3 liters) and then from methylene chloride (300 ml) into methanol (3 liters), the yield of vacuum dried polymer was 20.2 grams. The overall GPC Mw and Mn were 94,590 and 96,460 and a bimodal trace was observed. Chain coupling had taken place within the four hours continued reaction. Approximately 73% of the polymer had a GPC Mw 113,000 and Mn 100,400. The remaining 27% was Mw 39,960 and Mn 37,300. The ¹H NMR spectrum was consistent with poly-1,2-butadiene with 96.3% 1,2-vinyl groups.

Trial 10. Reaction of 1,3-Butadiene with sec-Butyllithium-Dissopropenylbenzene Adduct and 1,2-Dipiperidinoethane in Cyclohexane.

NMR spectrum of the vacuum dried polymer was consistent with poly-1,2 butadiene with 71.4% 1,2-vinyl groups. The remainder of the reaction mixture was treated with 2-propanol (1 ml) after 17 hours. After reprecipitation into 2-propanol, and then from methylene chloride into 2-propanol and then methanol as before, the polymer was vacuum dried. The ¹H NMR spectrum was consistent with poly-1,2-butadiene with 99.3% 1,2-vinyl groups. The GPC Mw and Mn were respectively 248,450 and 129,600 and the trace was bimodal. The Mn of the product was twice the calculated Mn of 65,000. Thus, chain coupling reactions probably took place during the extended reaction time.

Styrene-Butadiene Copolymerization With Organolithium Reagents And Polar Modifiers.

The copolymerization of butadiene and styrene with organolithium reagents complexed with DPE, TMEDA or THF proceeds with more than 60% 1,2-vinyl enhancements, as shown in Table 1. With TMEDA and DPE, the chain coupling reaction evident in butadiene homopolymerizations also seems to take place in the copolymerization of butadiene with styrene.

TABLE 1

| Experiment | wt % Styrene/ wt % Butadiene | Polar Modifier | Reaction Temperature(°C.) | % 1,2 Vinyl Content | Tg(°C.) |
| --- | --- | --- | --- | --- | --- |
| Prior Art (Halasa et al) | 35/65 | TMEDA | 33 | 67–72 | N.A. |
| Trial 3 | 77/23 | 25 wt % THF | −5 | 83.5 | 50–53 |
| Trial 4 | 75/25 | TMEDA | −5 | 61.3 | 45 |
| Trial 5 | 78/21 | DPE | −5 | 78.5 | 47–50 |

A 1-liter, 3 neck round bottom flask equipped with a mechanical stirrer, thermometer, and septum was purged with argon. The reaction mixture was vigorously rinsed with 1.3 molar sec-butyl-lithium (20 ml) and cyclohexane (50 ml), and was then washed with cyclohexane (50 ml). To the then empty reaction vessel were added cyclohexane (400 ml), sec-butyllithium (1.80 ml of a 1.3 molar solution in cyclohexane), and 1,3-diisopropenyl benzene 10.20 ml, 0.18g). The mixture was then heated for 4 hours at 50° C. After cooling to −10° C. using a dry ice-isopropanol both, 1,2-dipiperiodinoethane (1.0 ml) was then added. The solution turned from red to orange. One hour later, 1,3-butadiene (37.94 g) in cyclohexane (300 ml, 231.1 g) was added over 5 minutes between −10° and 3° C. After 4 hours had passed, a 400-ml aliquot was withdrawn from the reaction and 2-propanol (1 ml) was added. The polymer was precipitated into 2-propanol and then reprecipitated from methylene chloride (100 ml) into 2-propanol (1500 ml) and from methylene chloride (100 ml) into methanol (2 liters). The ¹H Gel permeation chromatography (GPC) analysis of the Trial 4 product obtained after 16 hours reaction (12 hours at 25° C.) was consistent with a bimodal molecular weight distribution with 40% low molecular weight (Mw/Mn=23700/ 20900) and 60% high molecular weight (Mw/Mn=82000/ 67000). The overall polydispersity Mw/Mn was 61700/ 37600 as measured by GPC. The bimodal nature of the polymer products is believed to be a consequence of chain coupling attributed to the high reactivity of the organolithium/DPE or TMEDA moieties towards 1,2-vinyl groups in other polymer chains. By contrast, chain coupling reactions are not apparent in mixed 25 vol % THF/75 vol % cyclohexane solvents.

Copolymer Randomness

Structural randomness in the styrene-butadiene copolymers was determined by a study involving the analysis of copolymer product compositions as a function of reaction time. The reactions are complicated by the chain coupling reactions already described. The results are summarized in Table 2.

TABLE 2

Polymer Composition with Reaction Time In Conjunction with Chain Coupling Side Reactions for Anionic Styrene-Butadiene Copolymers Prepared With 2 Moles DPE Per Mole of sec-Butyllithium

| Reaction | Reaction Time, Hours | GPC Mw | GPC Mn | wt % Styrene | wt % Butadiene | 1,2-Vinyl Content |
|---|---|---|---|---|---|---|
| Trial 6 | 0.5 | 26200 | 23200 | 64.7 | 35.3 | 66.4 |
|  | 16 | 80400 | 59800 | 82.3 | 17.7 | 71.2 |
|  | Calculated Values |  | 39600 | 82.4 | 17.6 |  |
| Trial 7 | 0.5 | 25400 | 21400 | 65.3 | 34.7 | 76.8 |
|  | 16 | 118000 | 71100 | 78.9 | 21.1 | 77.5 |
|  | Calculated Values |  | 40700 | 81.8 | 18.2 |  |

The reaction rates of Trials 6 and 7 are much slower than expected in that complete conversion of monomers to copolymer requires up to 16 hours. During that time, concomitant chain coupling produces products having multimodal molecular weight distributions which are appreciably higher than the theoretically calculated values. The calculated values are based on the presumption that chain coupling does not occur. Butadiene polymerizes in preference to styrene even though styrene is present in higher concentrations throughout the reaction. The 1,2-vinyl content is nearly the same within one-half hour and after 16 hours reaction.
Butadiene Polymerization With Organolithium Reagents And Polar Modifiers.

As shown in Table 3, butadiene polymerizes in cyclohexane with a 2 to 1 mole ratio of DPE per organolithium group to form polybutadiene with more than 95% 1,2-vinyl groups. Monofunctional and difunctional initiators with DPE behave similarly. In addition to polymerization, the highly reactive separated ion pairs compete in a side reaction involving chain coupling. The results set forth in Table 3 demonstrate that the molecular weight distribution may be controlled by preventing chain coupling. A narrow weight distribution is preferred in order to provide superior minimum fusing temperatures and improved gloss levels.

TABLE 3

Anionic Polymerization of Butadiene in Cyclohexane with Organolithium and DPE.

| Experiment | Molar Ratio of Butyllithium Initiator to DPE | Reaction Temperature °C. | % 1,2-Vinyl Content | GPC Analysis Results Mw | Mn | Mn Calculated |
|---|---|---|---|---|---|---|
| Trial 9 | sec- BuLi/ 2 DPE | 0 | 95 | 42700 | 38000 | 41000 |
| Trial 10 | DIPB/ 2 sec- BuLi/ 4 DPE | 0 | 99 | 248000 | 129600 | 65,000 |

Trial 9 was used to demonstrate the chain coupling side reaction which occurred with increased reaction times. Within four hours, the number average molecular weight of 73% of the Trial 9 product had tripled from 37,300 to 100,500. The remaining 27% of the Trial 9 product had a number average molecular weight which was the same as Trial 9 product after 1 hour reaction, i.e. 37,000. This result is consistent with chain coupling reactions most likely involving living polymer and 1,2-vinyl groups on other polymer chains. If theoretical molecular weights are desired, the reactions should be terminated after the first hour.

Living polymers with TMEDA and DPE in solution at 25° C. are prone to molecular weight increases by chain coupling. However, the same polymers in solutions that have been terminated with alcohols are also prone to cross-link on aging. Insoluble products are sometimes formed within 16 hours at 25° C. The cross-linking mechanism is not understood, although oxidative coupling might be a possible mechanism. Copolymer products are therefore preferably isolated from reaction solutions as soon as possible after termination with alcohols so that a useful product can be reliably obtained.

Trial 10 shows that lithium di-initiator in the presence of dipiperidinoethane yields polybutadiene with greater than 99% 1,2-vinyl groups. Chain coupling side reactions are also apparent. When greater than 50 wt. % styrene copolymerizes with butadiene under the same conditions, the 1,2-vinyl content in the copolymer produced is unexpectedly low, near 65% and not the anticipated 99% observed in the case of butadiene homopolymerization. One explanation is that styrene interferes with the 1,2-vinyl polymerization of butadiene by changing the reactivity of the propagating anions, i.e., more intimate ion-pairing takes place possibly due to the aggregation of living polystyrene ends.

The following conclusions were made:

(1) In cyclohexane, anionic polymerizations of styrene and butadiene with organolithium/TMEDA or DPE complexes are slower than expected based on the homopolymerization of butadiene. A reaction time of over 1 hour at 0° to −5° C. is required for complete conversion of monomer to high polymer. The conversion is substantially completed within a much shorter time, however.

(2) Butadiene is preferentially incorporated into the polymer chain early in the reaction, even though styrene is present in a higher concentration.

(3) Products made with polar modifiers are nearly random, especially when compared with the block copolymers produced without randomizing agents.

(4) Polymer chain coupling reactions take place almost immediately with organolithium/TMEDA or DPE initiators and dominate the product molecular weight between 1 and 5 hours reaction time.

(5) The 1,2-vinyl content approaches 70–80% in styrene-butadiene copolymers prepared with DPE and TMEDA. This is appreciably lower than the expected 95% 1,2-vinyl content obtained for polybutadiene produced when butadiene is homopolymerized under the same conditions.

(6) When styrene-butadiene copolymers are left in solution with the alcohols used to terminate the living polymers, the copolymers are prone to cross-linking within 16 hours at 25° C. when DPE and TMEDA are present. Insoluble polymer is formed.

(7) Styrene-butadiene copolymers made with TMEDA, DPE or THF and organolithium reagents are useful for the preparation of toners. Materials with Tg values between 25° and 60° C. are preferred; however, lower Tg materials are also useful in specific circumstances. Number average molecular weights of polymers preferred for use in toners are less than 150,000, and are more preferably between 10,000 and 50,000. The chain coupling side reactions that occur during and after polymerization produce multi-modal resins and toners which demonstrate excellent fusing latitudes. Monomodal resins are preferred over materials where gloss control is considered important and in cases where the lowest minimum fix temperatures are desired.

It will be apparent to those skilled in the art that various modifications and variations can be made in the present invention without departing from the scope or spirit of the invention. Thus, it is intended that the present invention cover the modifications and variations of this invention provided they come within the scope of the appended claims and their equivalents.

What is claimed is:

1. A solution polymerization process for producing an organic polymer from styrene and at least one polymerizable diene monomer, said process comprising:

a) providing a liquid reaction medium suitable for conducting said polymerization, said reaction medium containing styrene and a polymerizable diene monomer; and, b) anionically polymerizing said styrene and said diene monomer, thereby forming random copolymer chains, wherein the total quantity of said styrene used in said polymerization is at least 50% by weight based on the total weight of styrene and polymerizable diene monomer used in said polymerization and wherein a randomizing agent is added to said reaction medium prior to and/or during said polymerization in an amount sufficient to direct insertion of said diene monomer in the polymer to more than 50% 1,2-vinyl regio-stereoisomer.

2. The process of claim 1, wherein said randomizing agent is selected from N,N,N',N'-tetramethylenediamine, tetrahydrofuran and 1,2-dipiperidinoethane.

3. The process of claim 1, wherein said randomizing agent is an alkali metal salt of butylated hydroxy toluene.

4. The process of claim 1, wherein said polymerizable monomer is butadiene.

5. A solution polymerization process for producing an organic polymer, said process comprising:

a) providing a liquid reaction medium suitable for conducting said polymerization, said reaction medium containing a randomizing agent, styrene and a polymerizable diene monomer, wherein the total quantity of said styrene used in said polymerization is at least 50% by weight based on the total weight of styrene and polymerizable diene monomer used in said polymerization and wherein the amount of said randomizing agent is sufficient to direct insertion of said diene monomer in the polymer to more than 50% 1,2-vinyl regio-stereoisomer; and, b) anionically polymerizing said diene monomer and said styrene, wherein a difunctional initiator is used to initiate said polymerization.

6. The process of claim 5, wherein said initiator is an organolithium compound.

7. The process of claim 5, wherein said liquid reaction medium comprises cyclohexane.

8. The process of claim 5, wherein said randomizing agent is selected from N,N,N',N'-tetramethylenediamine, tetrahydrofuran and 1,2-dipiperidinoethane.

* * * * *